United States Patent
Wang et al.

(10) Patent No.: US 11,671,177 B2
(45) Date of Patent: Jun. 6, 2023

(54) 8WDM OPTICAL TRANSCEIVER AT 10NM WAVELENGTH GRID

(71) Applicant: Google LLC, Mountain View, CA (US)

(72) Inventors: Liming Wang, San Jose, CA (US); Xiang Zhou, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/339,400

(22) Filed: Jun. 4, 2021

(65) Prior Publication Data
US 2022/0271841 A1    Aug. 25, 2022

Related U.S. Application Data

(60) Provisional application No. 63/153,476, filed on Feb. 25, 2021.

(51) Int. Cl.
*H04B 10/572* (2013.01)
*H04B 10/50* (2013.01)
(Continued)

(52) U.S. Cl.
CPC ........... *H04B 10/506* (2013.01); *H04B 10/40* (2013.01); *H04B 10/572* (2013.01); *G02B 6/4249* (2013.01)

(58) Field of Classification Search
CPC .... H04B 10/506; H04B 10/40; H04B 10/572; H04B 10/50; H04B 10/60; G02B 6/4249;
(Continued)

(56) References Cited

U.S. PATENT DOCUMENTS

| 6,515,776 | B1 * | 2/2003 | Naganuma | ............ H04J 14/02 398/88 |
| 7,209,664 | B1 | 4/2007 | McNicol et al. | |

(Continued)

FOREIGN PATENT DOCUMENTS

| CN | 108551372 A | 9/2018 | |
| EP | 1146681 A2 * | 10/2001 | ............ H04J 14/02 |

(Continued)

OTHER PUBLICATIONS

400G CWDM8 10 km Technical Specifications, Revision 1.1, Feb. 13, 2018, 16 pages.
(Continued)

*Primary Examiner* — Hibret A Woldekidan
(74) *Attorney, Agent, or Firm* — Lerner David LLP

(57) ABSTRACT

An optical transceiver may include an optical transmitter and an optical receiver. The optical transmitter and receiver may each include a grid including one or more lanes spaced apart. Each lane may correspond to a predetermined optical signal, or wavelength. The optical transmitter may include one or more sets of lasers to output one or more optical signals corresponding to the grid. Each set of laser may output a set of optical signals. Each set of lasers and, therefore, each set of optical signals may have a different passband. For example, the multiplexing and/or demultiplexing architecture may have a wide passband for the first set of optical signals and a narrow passband for the second set of optical signals. The narrow passband may be determined based on the space between two wider passbands.

9 Claims, 5 Drawing Sheets

(51) Int. Cl.
 *H04B 10/40* (2013.01)
 *G02B 6/42* (2006.01)
(58) Field of Classification Search
 CPC ...... H04J 14/02; H04J 14/0282; H04J 14/025;
  H04J 14/0213; H04J 14/0216; H04J
  14/0265; H04J 14/0278; H04J 14/0201;
  H04J 14/0221; H04J 14/0205; H04J
  14/0208; H04J 14/0209; H04J 14/00;
  H04J 14/08; H04Q 11/00; H04Q 11/04
 USPC ......... 398/79, 82, 84, 85, 68, 135, 138, 139,
  398/140, 141
 See application file for complete search history.

(56) References Cited

U.S. PATENT DOCUMENTS

| | | | |
|---|---|---|---|
| 7,787,772 B2 | 8/2010 | Ota | |
| 7,831,118 B2 | 11/2010 | Oikawa et al. | |
| 2006/0104639 A1* | 5/2006 | Zami | H04J 14/0246 |
| | | | 398/79 |
| 2015/0043919 A1* | 2/2015 | Handelman | H04B 10/506 |
| | | | 398/79 |
| 2016/0087747 A1* | 3/2016 | Way | H04J 14/0221 |
| | | | 398/81 |
| 2018/0337736 A1* | 11/2018 | Tian | H01L 25/167 |

FOREIGN PATENT DOCUMENTS

| | | |
|---|---|---|
| EP | 1146681 A2 | 10/2001 |
| EP | 3550680 A1 | 10/2019 |

OTHER PUBLICATIONS

Bautista et al., "Filter technologies vie for DWDM system applications," [online] [retrieved Jun. 4, 2021]. Retrieved from the Internet: <URL:https://www.photonicsonline.com/doc/filter-technologies-vie-for-dwdm-system-appli-0002>, Jul. 18, 2000, 5 pages.

Extended European Search Report for European Patent Application No. 21186998.7 dated Jan. 21, 2022. 10 pages.

* cited by examiner

8WDM OPTICAL TRANSCEIVER AT 10NM WAVELENGTH GRID

CROSS-REFERENCE TO RELATED APPLICATIONS

The present application claims the benefit of the filing date of U.S. Provisional Application No. 63/153,476, filed on Feb. 25, 2021, the disclosure of which is hereby incorporated herein by reference.

BACKGROUND

Optical transceivers may be used for data communications. Such transceivers typically include multiple optical transmitters and paired with optical receivers. Such transceivers often times employ one or more lasers that operate at different wavelengths. Different modulation techniques are used to modulate the laser light at each wavelength to carry encoded information or symbols. The wavelengths of the laser within the transceivers may be equally spaced in lanes, forming a grid. The grid may be for a specific optical band. The lanes, or wavelengths, may be multiplexed together at the transmitter end and demultiplexed at the receiver end of a fiber channel. As the modulated signal from the laser passes through dispersive media, such as for example a fiber, the pulse width of the modulated signal may be broadened. The dispersion effect leads to inter-symbol interference. For a given data rate and target reach distance, this dispersion effect limits the minimum maximum channel frequency a transceiver can utilize.

BRIEF SUMMARY

The present disclosure provides an optical transceiver design that can increase its data capacity without the need to significantly extend the wavelength range beyond what it has while maintaining backwards compatibility with previous iterations of optical transceivers. According to some examples, the optical transceiver may include an optical transmitter and an optical receiver. The optical transmitter may multiplex one or more optical signals before transmitting the multiplexed signal. A multiplexed signal may be a signal in which one or more optical signals have been combined into a composite signal. The optical receiver may receive a multiplexed optical signal. The optical signal may demultiplex the multiplexed optical signal into one or more optical signals.

The optical transmitter may include two sets of lasers. Each set of lasers may output a set of optical signals. Each optical signal may correspond to a lane within a grid. The grid may define the spacing between the lanes, or optical signals. According to some examples, the first set of lasers may create a first set of lanes and the second set of lasers may create a second set of lanes. Each set of lanes may include, for example, four signals such that there is a total of eight signals on a grid. The lanes may be spaced 10 nm apart. The first set of signals may have a wide passband and the second set of signals may have a narrow passband. The first set of signals may provide for compatibility with previous iterations of optical transceivers while the second set of signals may provide for an increased data capacity without reducing its reach.

One aspect of the disclosure includes an optical receiver comprising a demultiplexer configured to demultiplex an optical signal received by the optical receiver into a first set of optical signals and a second set of optical signals, the first set of optical signals each having a respective first passband and the second set of optical signals each having a respective second passband, at least one of the respective second passband being smaller than at least one of the respective first passband, and the at least one respective second passband is located between respective first passbands.

Each of the first set of optical signals and the second set of optical signals may include four optical signals. The four optical signals of the first set of optical signals may include optical signals having wavelengths of 1271 nm, 1291 nm, 1311 nm, and 1331 nm. The four optical signals of the second set of optical signals may include optical signals having wavelengths of 1281 nm, 1301 nm, 1321 nm, and 1341 nm. The four optical signals of the second set of optical signals may include optical signals having wavelengths of 1261 nm, 1281 nm, 1301 nm, and 1321 nm.

The first set of optical signals and the second set of optical signals may be aligned in a cascade such that the second set of optical signals increases a capacity of a transceiver without affecting a reach of the transceiver. The first set of optical signals in the cascade may be arranged closer to a location where the composite signal is receiver than the second set of optical signals in the cascade.

The optical receiver may further comprise an interleaver configured to filter the optical signal received by the optical receiver into a first composite signal and a second composite signal. The interleaver may be configured to demultiplex the first composite signal into the first set of signals and the second composite signal into the second set of signals.

Each optical signal of the first set of optical signals and each optical signal of the second set of optical signals may be spaced 10 nm from an adjacent optical signal of the first set of optical signals or the second set of optical signals.

Another aspect of the disclosure includes an optical transmitter comprising a multiplexer configured to multiplex at least one of a first set of optical signals and a second set of optical signals, the first set of optical signals each having a respective first passband and the second set of optical signals each having a respective second passband, at least one of the respective second passband being smaller than at least one of the respective first passband, and the at least one respective second passband is located between respective first passbands.

The second set of lasers may be cooled using a thermoelectric cooler. Each of the first set of optical signals and the second set of optical signals may include four optical signals. The four optical signals of the first set of optical signals may include optical signals having wavelengths of 1271 nm, 1291 nm, 1311 nm, and 1331 nm. The four optical signals of the second set of optical signals may include optical signals having wavelengths of 1281 nm, 1301 nm, 1321 nm, and 1341 nm. The four optical signals of the second set of optical signals may include optical signals having wavelengths of 1261 nm, 1281 nm, 1301 nm, and 1321 nm. Each optical signal of the first set of optical signals and each optical signal of the second set of optical signals may be spaced 10 nm from an adjacent lane optical signal of the first set of optical signals or the second set of optical signals.

The optical transmitter may further comprise an interleaver configured to interleave the multiplexed first set of optical signals and the multiplexed second set of optical signals into a composite signal.

The first set of optical signals and the second set of optical signals may be aligned in a cascade such that each optical signal in the second set of optical signals travels a further distance between a source and a destination over medium than each optical signal in the first set of optical signals. The first set of optical signals in the cascade are arranged closer to a location where the multiplexed first set of optical signals or the multiplexed second set of optical signals is transmitted than the second set of optical signals.

DETAILED DESCRIPTION

Figure 1:
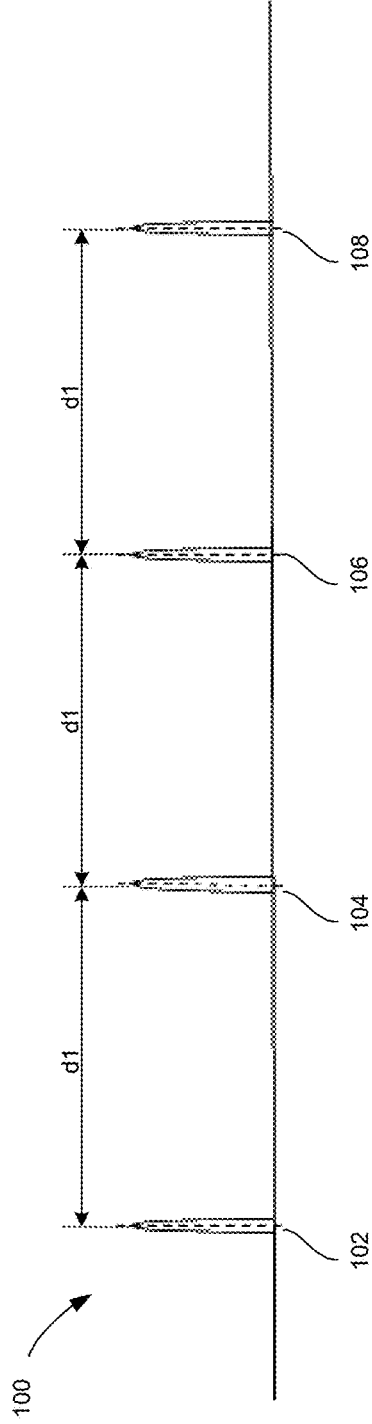
FIG. 1 illustrates an example of coarse wavelength division multiplex ("CWDM") spacing of four wavelengths according to aspects of the disclosure.

Aspects of the disclosed technology may include an optical transmitter and/or an optical receiver. In some examples, the transmitter and receiver may comprise an optical transceiver in which a transmitter and receiver are collocated and paired to independently transmit and receive optical signals. In other examples, an optical transceiver may comprise a transmitter and receiver pair at different ends of a communication medium, such as an optical fiber. The optical transmitter and the optical receiver may each include a grid. The grid may define a number of lanes and/or the spacing of lanes. For example, the grid may include four, eight, sixteen, etc. lanes. Each lane may correspond to a wavelength. The optical transmitter may include one or more sets of lasers. According to some examples, the laser may output an optical signal such as for example a modulated optical signal. The optical signal(s) output by the one or more sets of lasers may be multiplexed before being transmitted from the optical transceiver. In some examples, the optical signals output by the lasers may go through two stages of multiplexing. The optical receiver may receive one or more optical signals. In some examples, the optical receiver may receive a multiplexed optical signal. The optical receiver may demultiplex the multiplexed optical signal into one or more optical signals. Each optical signal of the multiplexed or demultiplexed optical signal may correspond to a lane within the grid.

In some examples, an optical transceiver may include two sets of lasers. The first set of lasers may output a first set of optical signals and the second set of lasers may create a second set of optical signals. The first set of optical signals may correspond to the optical signals used in previous iterations of optical transceivers. Having the first set of optical signals correspond to the optical signals of previous iterations of optical transceivers allows for compatibility between the optical transceiver described herein and the previous iterations of optical transceivers. Including two sets of lasers, one set corresponding to the set of lasers used in previous iterations, may decrease the manufacturing costs associated with the optical transceiver.

The second set of optical signals may increase the capacity of the optical transceiver while maintaining its reach. The increased capacity and maintained reach may be as compared to other optical transceivers in which a second set of optical signals occupy wavelengths beyond, or greater than, a first set of optical signals, which will increase the capacity of the optical transceiver but decrease its reach.

The reach may be determined based on the first set of optical signals. The second set of optical signals may increase the capacity of the transceiver. By adding the second set of optical signals, the capacity may increase without having to reduce the reach.

According to some examples, when an optical transceiver with a second set of lasers is coupled to or connected with the previous iteration optical transceiver, the second set of lasers may be disabled such that only the first set of lasers, and therefore the first set of optical signals, is multiplexed and demultiplexed. This first set of optical signals may be considered a first set of multiplexed and demultiplexed lanes. The first set of multiplexed and demultiplexed lanes may be compatible with the multiplexed and demultiplexed lanes of a previous iteration or earlier generation of optical transceiver.

Each laser in the set of lasers may output a modulated signal. According to some examples, each set of lasers may output one or more modulated signals. The number of modulated signals output by the sets of lasers may correspond to the number of lanes within the grid. For example, each set of lasers may include four lasers. In examples where there are two set of lasers, with four lasers in each set, there would be eight lanes in the grid According to some examples, the lanes in the grid may be spaced by a predetermined amount. In some examples, the lanes may be spaced a predetermined amount of 1 nm or more. For example, grids used for optical communications commonly space the lanes 20 nm apart.

The passband, or filter, for each set of lasers may be different. For example, the first set of lasers may have a wide passband and the second set of lasers may have a narrow passband. The wide passband may correspond to the passband of the lasers used in the previous iterations of optical transceivers. This allows for backwards compatibility between the optical transceiver and previous iterations. The narrow passband may be narrow enough to fit within the space between each of the wide passbands. For example, if the first set of lanes are spaced 20 nm apart and the wide passband is 13 nm, such that the laser may have an uncertainty of +/−6.5 nm on either side of the center of the lane, there may be a space of 7 nm between two wide passbands. As a result, the narrow passband should be less than 7 nm or there may be cross-talk between the lanes.

According to some examples, the first set of lanes and the second set of lanes may be cascaded. For example, the lanes may be ordered such that the optical signals from the first set of lanes experience a shorter path as compared to the optical signals from the second set of lanes. In some examples, the first set of lanes and the second set of lanes may be combined with an interleaver device. The interleaver device may be an optical filter with a periodic pass and reject spectrum response.

The optical transceiver described herein takes advantage of a sunk cost and provides a backwards compatible optical transceiver with increased capacity without reducing the reach that can be used for data communications. In particular, the optical transceiver described herein uses two sets of lasers to produce two sets of signals. The first set of lasers and, therefore, the first set of signals correspond to the lasers and signals used in previous iterations of data communications optical transceivers. By using lasers and signals used in previous iterations, manufacturing costs may be decreased. Additionally, by using lasers and signals used in previous iterations, the optical transceiver described herein is backwards compatible with previous iterations. By including a set second set of lasers, the capacity of the optical transceiver can be increased.

FIG. 1 illustrates an example grid for optical transmitters and optical receivers within an optical transceiver. The grid may identify the spacing of lanes. Each lane may correspond to a wavelength being transmitted or received.

As shown, optical signals 102, 104, 106, 108 centered at predetermined wavelengths within grid 100 may be spaced by a distance "d1". While only four signals 102, 104, 106, 108 are shown on grid 100, there may be more or less. According to some examples, there may be two, four, eight, sixteen, etc. signals spaced on a grid.

According to some examples, the distance "d1" between each signal 102, 104, 106, 108 on grid 100 may be 20 nm. A spacing of 20 nm is commonly used in optical transceivers for data communications. However, the distance, or spacing, "d1" may be more or less than 20 nm. In some examples, the distance "d1" may be between 1-25 nm or greater. Thus, the distance "d1" being 20 nm is merely one example and is not intended to be limiting.

Data communications applications may use grids in which the optical signals for a given wavelength, or lanes, are spaced 20 nm apart. For example, in the O-band, the signals 102, 104, 106, 108 may correspond to wavelengths 1271 nm, 1291 nm, 1311 nm, and 1331 nm, respectively. A grid 100 with signals 102, 104, 106, 108 corresponding to wavelengths 1271 nm, 1291 nm, 1311 nm, and 1331 nm is commonly referred to as a CWDM4 grid.

A CDMW4 grid may be used for 4×10 Gb/s, 4×25 Gb/s, 4×50 Gb/s, 4×100 Gb/s data rates, or higher, per lane. In this regard, a data stream or information is used as a part of a modulation scheme to modulate the laser light at a given wavelength of a lane to transmit the information from source to destination over a communication medium or media. The distance between source and destination may be considered the reach of the system. As the modulated signal travels through dispersive media, such as a single mode fiber, the pulse width of the optical signal broadens more as the reach of the system increases. The modulated signal may be a 4-level pulse amplitude modulation signal ("PAM4"). Broadening the pulse width limits the reach for a given data rate per lane. In examples where the data rate per lane is increased to 4×200 Gb/s PAM4, the reach of the outer lanes, such as pulse 102 and pulse 108, is reduced compared to 100 Gb/s PAM4. In some examples, additional lanes can be added to the optical transceiver instead of increasing the capacity of each lane. According to some examples, adding additional lanes beyond the nominal wavelength range of 1264.5 nm-1417.5 nm, the reach may be reduced due to media dispersion.

Figure 2:
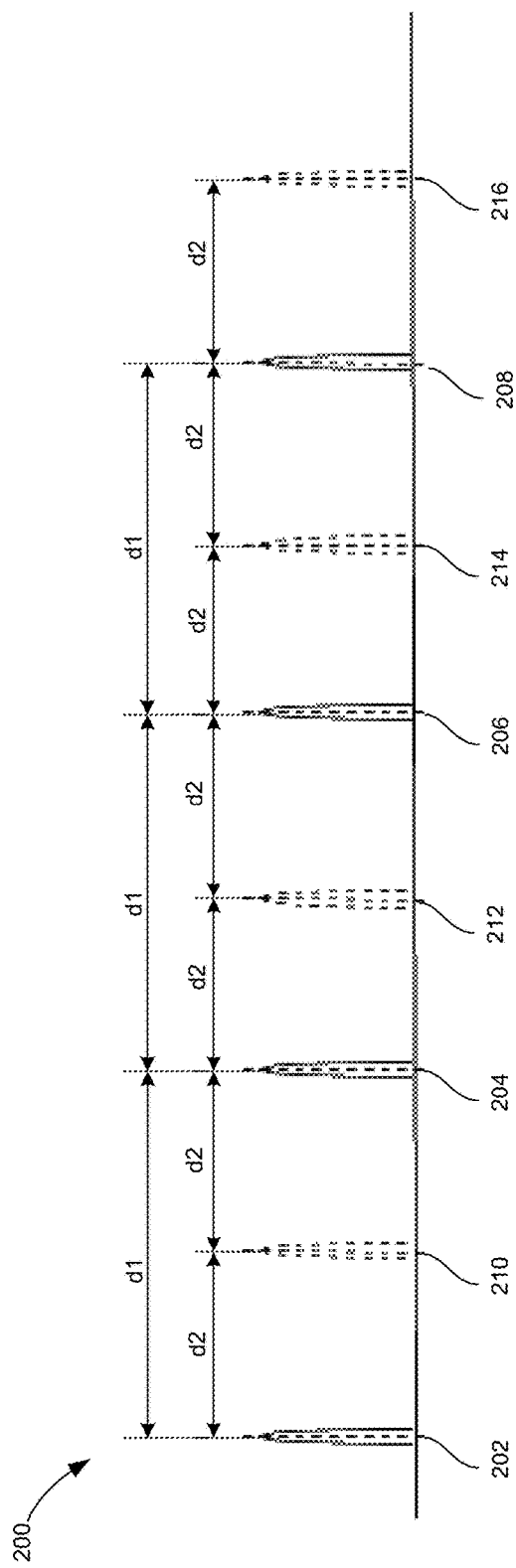
FIG. 2 illustrates an example of wavelength division multiplex ("WDM") spacing of eight wavelengths according to aspects of the disclosure.

FIG. 2 illustrates another example grid for optical transmitters and optical receivers within an optical transceiver. Grid 200 may include eight optical signals 202-216, or lanes. The signals 202-216 may each be spaced apart by a distance "d2". The distance "d2" is smaller than distance "d1" of FIG. 1. According to some examples, distance "d2" is half the distance of distance "d1".

The eight signals 202-216 may be grouped into two sets of wavelengths. For example, signals 202-208 may be a first set of signals and signals 210-16 may be a second set of signals. The first set of signals 202, 204, 206, and 208 may correspond to signals 102, 104, 106 and 108, respectively, in FIG. 1. According to some examples, the first set of signals 202, 204, 206, 208 may correspond to a standard set of signals. A standard set of signals may be a set of signals used in previous iterations of optical transceivers. Using a set of signals that was used in previous iterations allows for backwards compatibility between generations of optical transceivers. In examples where the optical transceiver is used for data communications, the standard set of signals may correspond to wavelengths 1271 nm, 1291 nm, 1311 nm, and 1331 nm. The second set of signals 210, 212, 214, 216 may be a non-standard set of optical signals. For example, the second set of signals 210, 212, 214, 216 may correspond to optical signals generally centered around wavelengths 1281 nm, 1301 nm, 1321 nm, and 1341 nm, respectively. According to some examples, the second set of signals 210, 212, 214, 216 may correspond to optical signals generally centered around wavelengths 1261 nm, 1281 nm, 1301 nm, and 1321 nm, respectively. Thus, the distance "d2" between each of the signals 202-216 may be 10 nm. The wavelengths identified for the second set of signals 210, 212, 214, 216, and therefore the distance "d2", is merely one example and is not intended to be limiting.

Including the standard set of signals as the first set of signals 202-208 allows the optical transceiver to be backwards compatible with previous iterations of optical transceivers. For example, previous iterations of optical transceivers may include only four lanes, or signals. The four signals in the previous iterations may be correspond to wavelengths 1271 nm, 1291 nm, 1311 nm, and 1331 nm. Thus, having a first set of signals 202-208 on grid 200 corresponding to the four signals in the previous iterations will allow the optical transceiver with grid 200 to be compatible with previous iterations of optical transceivers that used only the standard set of signals. Additionally or alternatively, to allow the optical transceiver to be backwards compatibility with previous iterations, the second set of signals 210-216 may be turned off when the optical transceiver is being used in conjunction with a previous iteration. For example, turning off the second set of signals 210-216 may include turning off the laser sources.

To increase the reach of each lane, the baud rate may be minimized. For example, a 50 GBaud signal has a longer reach than a 100 GBaud signal. In examples where the channels have the same characteristics, the more data being sent over that channel, the shorter the distance that data can be sent. Therefore, for the same power at the transmitter, the more data being transmitted will result in the distance that data travels being shorter. In some examples, to send more data the same distance, the power signal may be boosted in order to reach longer distances.

Figure 3:
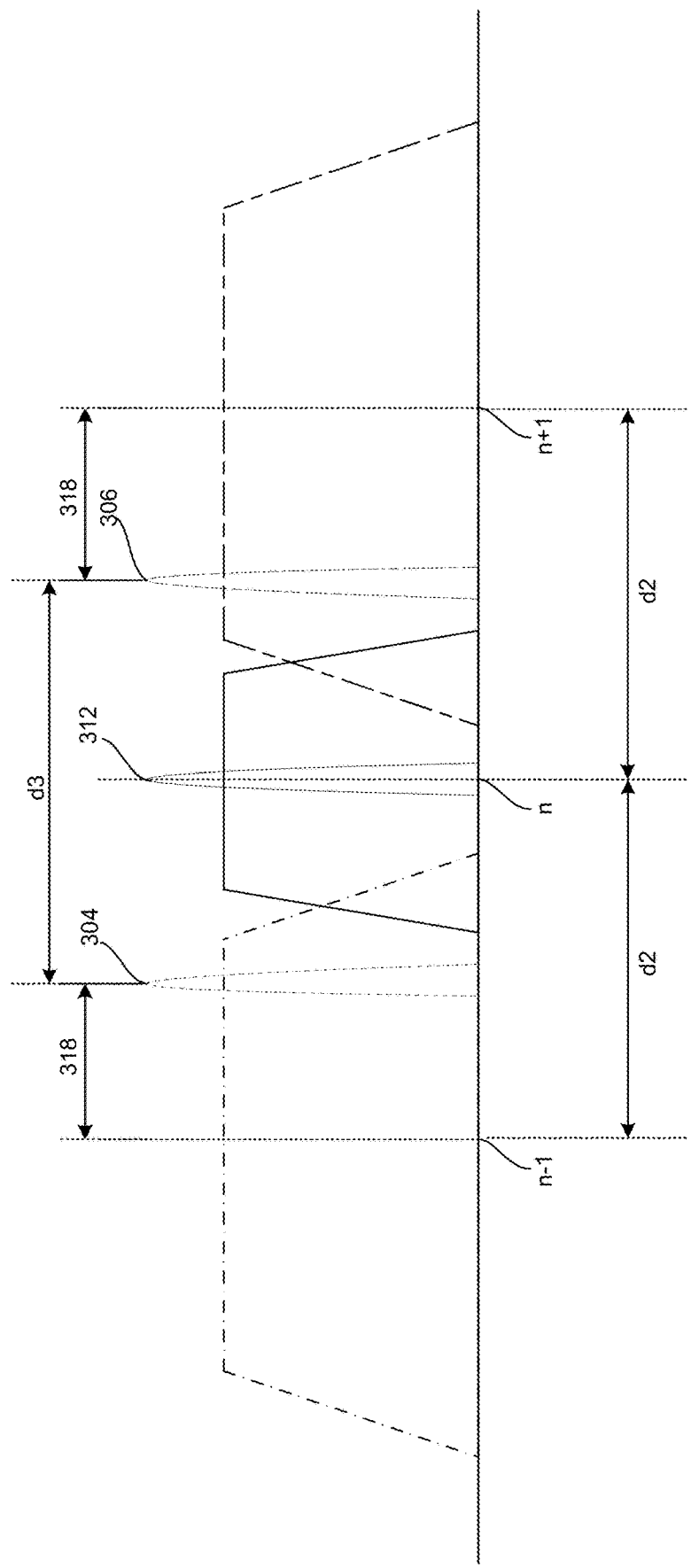
FIG. 3 illustrates an example of optical demultiplexing architecture with uneven passbands according to aspects of the disclosure.

FIG. 3 illustrates an example optical multiplexing and/or demultiplexing architecture with uneven passbands. In this example, an optical transmitter may include one or more set of lasers. Each set of lasers may output a set of optical signals. For example, if there are two sets of lasers there may be two sets of optical signals. An optical receiver may be configured to receive two sets of optical signals. Each set of optical signals may have a different passband. Having different passbands for each set of optical signals creates the optical multiplexing and/or demultiplexing architecture with uneven passband. For a second set of optical signals to fit between a first set of signals, the uncertainty and, therefore, the passband for the second set of signals has to equal to or smaller than the space between the passbands of the first set of signals.

According to some examples, the first set of lasers may have a first set of frequencies. The multiplexing and/or demultiplexing architecture for the first set of signals may have a wide passband. The second set of signals may be placed in the space left between the wide passbands of the first set of signals. In order to fit in the space left between the wide passbands of the first set of signals, the second set of signals may have narrow passbands. Thus, the multiplexing and/or demultiplexing architecture may have uneven passbands.

For instance, lane "n" may correspond to a signal 312 from the second set of signals and lanes "n−1" and "n+1" may correspond to optical signals 304, 306 corresponding to the first set of lasers. The lanes "n," "n−1," "n+1" may be spaced by a distance "d2." The signals in lanes "n−1" and "n+1" may have an uncertainty 318. The uncertainty 318 may be how far the signals deviate or drift from the location of the lane "n−1," "n+1" on the grid. For instance, assuming the location n+1 to define a spectral position corresponding to 1391 nm, uncertainty may correspond to how much the laser operating with a central wavelength of 1391 nm drifts from the 1391 nm wavelength such that the central wavelength is no longer at 1391 nm but may be at 1388 nm for example. According to some examples, the uncertainty 318 may correspond to as much as half the passband for the optical signal.

The example shown in FIG. 3 illustrates the maximum passband available for signal 312. For example, signal 304 may have an uncertainty 318 that deviated to the right of lane "n−1" and signal 306 may have an uncertainty 318 that deviated to the left of lane "n+1." The distance "d3" between signal 304 and signal 306 may correspond to the passband available for signal 312 in lane "n." Distance "d3" may be calculated using the following equation:

distance "d3"=2(distance "d2")−2(uncertainty 318)

In examples where CWDM lasers are not cooled, the signals produced by the lasers may have a larger uncertainty or drift. A laser that is cooled may have a smaller uncertainty. For example, lasers used in previous iterations of data communications optical transceivers may have an uncertainty of +/−6.5 nm. Thus, the passband required for a CWDM laser used in previous iterations of data communications optical transceivers may be 13 nm. A passband of 13 nm would allow the intended lane signal to pass on the demultiplexing receiver side of the optical transceiver. Additionally or alternatively, the passband of 13 nm mitigates against and/or prevents crosstalk between the lanes. However, the uncertainty of +/−6.5 nm and the corresponding passband of 13 nm is merely one example of a CWDM laser and is not intended to be limiting.

In the optical transceiver described herein, the first set of signals may have a wide passband and the second set of signals may have a narrow passband thereby creating an optical demultiplexing architecture with uneven passbands. For example, the first set of signals may be output by a first set of lasers corresponding to the CWDM lasers used in previous iterations of data communications optical transceivers. In the example shown in FIG. 3, the first set of lasers may be in lanes "n−1" and "n+1." The uncertainty 318 for lanes "n−1" and "n+1" would, therefore, be +/−6.5 nm. If the distance "d2" is 10 nm, as discussed with respect to FIG. 2, then the distance "d3" would be 7 nm. Thus, the maximum passband for the second set of signals could be 7 nm. To reduce the potential for cross talk between lane "n" and lanes "n−1," "n+1," the passband may be less than 7 nm. In some examples, the passband for the second set of lasers may be 2 nm. However, a narrow passband of 2 nm is merely one example and is not intended to be limiting. Accordingly, the passband may range from 1 nm to 7 nm, or more or less depending on how much the uncertainty associated with the first set of lanes can be controlled or reduced.

According to some examples, the second set of signals may be stabilized to half or less than half of the available passband. This would reduce the risk of crosstalk between the second set of signals and first set of signals. To stabilize the second set of signals, the second set of lasers may be temperature controlled. For example, the second set of lasers may be cooled using a thermoelectric cooler ("TEC").

Figure 4A:
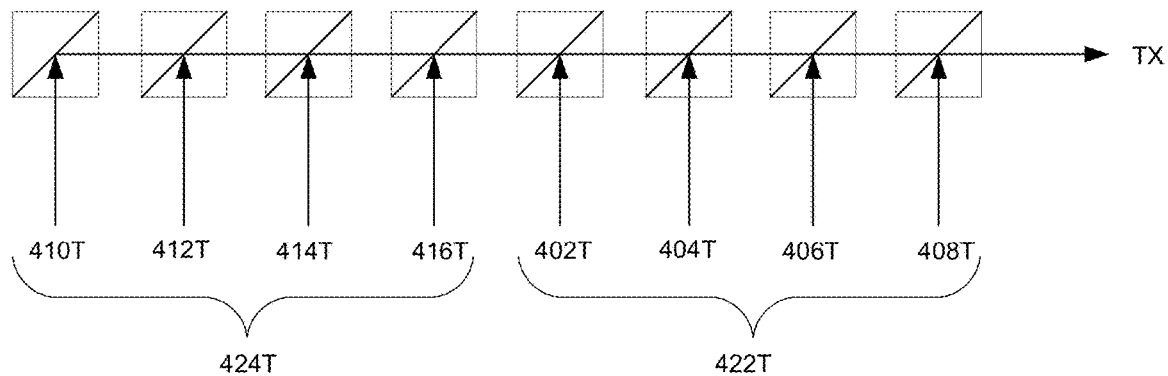
FIG. 4A illustrates an example of optical multiplexing lane order according to aspects of the disclosure.

FIG. 4A illustrates example arrangement of the lanes within a grid for a transmitter within the optical transceiver. The lanes may be arranged as a cascade of lanes 402T-416T, such that the lanes are aligned linearly. The lanes 402T-416T may be grouped into a first set of lanes 422T and a second set of lanes 424T. The first set of lanes 422T may correspond to the signals received from a first set of lasers. For example, the first set of signals may correspond to the signals used in previous iterations of optical transceivers. In examples where the previous iterations of optical transceivers are used for data communications applications, the first set of lanes 402T-408T may receive signals corresponding to wavelengths 1271 nm, 1291 nm, 1311 nm, and 1331 nm. The second set of lanes 424T may correspond to the signals received from a second set of lasers. For example, the second set of signals may correspond to signals, or wavelengths, that are spaced between the first set of signals. According to some examples, the second set of signals may correspond to wavelengths 1281 nm, 1301 nm, 1321 nm, and 1341 nm. As the plurality of signals are received by the transmitter, the signals are multiplexed into a single signal before being transmitted by the transmitter. Each of the plurality of signals may be within a lane.

The first set of lanes 422T may be arranged in the lanes closest to the location where the signals exit the transmitter "TX". The second set of lanes 424T may be arranged in the lanes furthest from the location where the signals exit the transmitter "TX". By arranging the first set of lanes 422T closer to the location where the signals exit the transmitter "TX" and the second set of lanes 424T further from the location where the signals exit the transmitter "TX", the optical signals from the first set of lanes 422T experience a shorter path to a receiver than the optical signals from the second set of lanes 424T. By providing a shorter path for the first set of lanes 422T, the insertion loss of the optical signals in the first set of lanes 422T is lowered and/or minimized. According to some examples, there is no insertion loss when the first set of lanes 422T are arranged closest to the location where the signals exit the transmitter "TX".

Figure 4B:
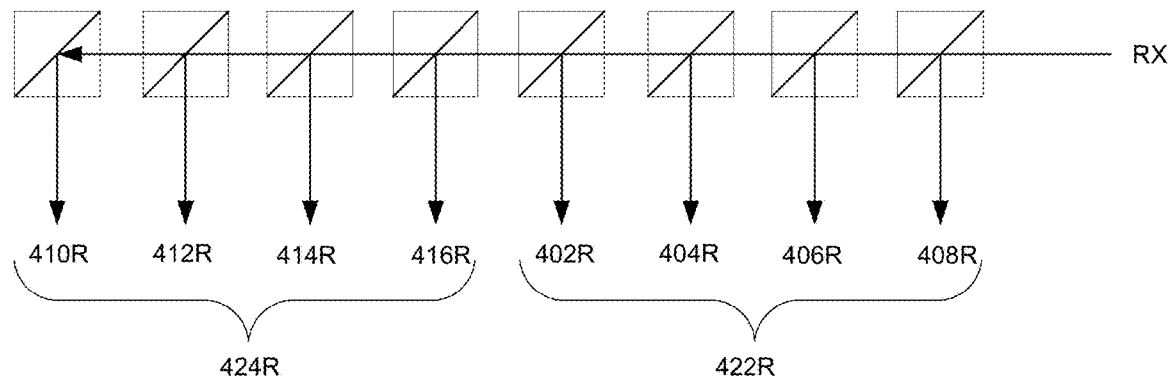
FIG. 4B illustrates an example of optical demultiplexing lane order according to aspects of the disclosure.

FIG. 4B illustrates an example arrangement of lanes within a grid for a receiver within the optical transceiver. The lanes may be arranged a cascade of lanes 402R-416R, such that the lanes are aligned linearly. The lanes 402R-416R may be grouped into a first set of lanes 422R and a second set of lanes 424R. The first set of lanes 422R may correspond to the signals received from a first set of lasers. For example, the first set of signals may correspond to the signals used in previous iterations of optical transceivers. The second set of lanes 424T may correspond to the signals received from a second set of lasers. As the signals from the lanes are received by the receiver, the signals are demultiplexed into a plurality of signals. Each of the plurality of signals may correspond to a lane.

The first set of lanes 422R may be arranged in the lanes closest to the location where the signals enter the receiver "RX". The second set of lanes 424R may be arranged in the lanes furthest from the location where the signals enter the receiver "RX". By arranging the first set of lanes 422R closer to the location where the signals enter the receiver "RX" and the second set of lanes 424R furthest from the location where the signals enter the receiver "RX", the optical signals from the first set of lanes 422R experience a shorter path than the optical signals from the second set of lanes 424R. By providing a shorter path for the first set of lanes 422R, the insertion loss of the optical signals in the first set of lanes 422RT is minimized. According to some examples, there is no insertion loss when the first set of lanes 422R are arranged closest to the location where the signals exit the transmitter.

Figure 5A:
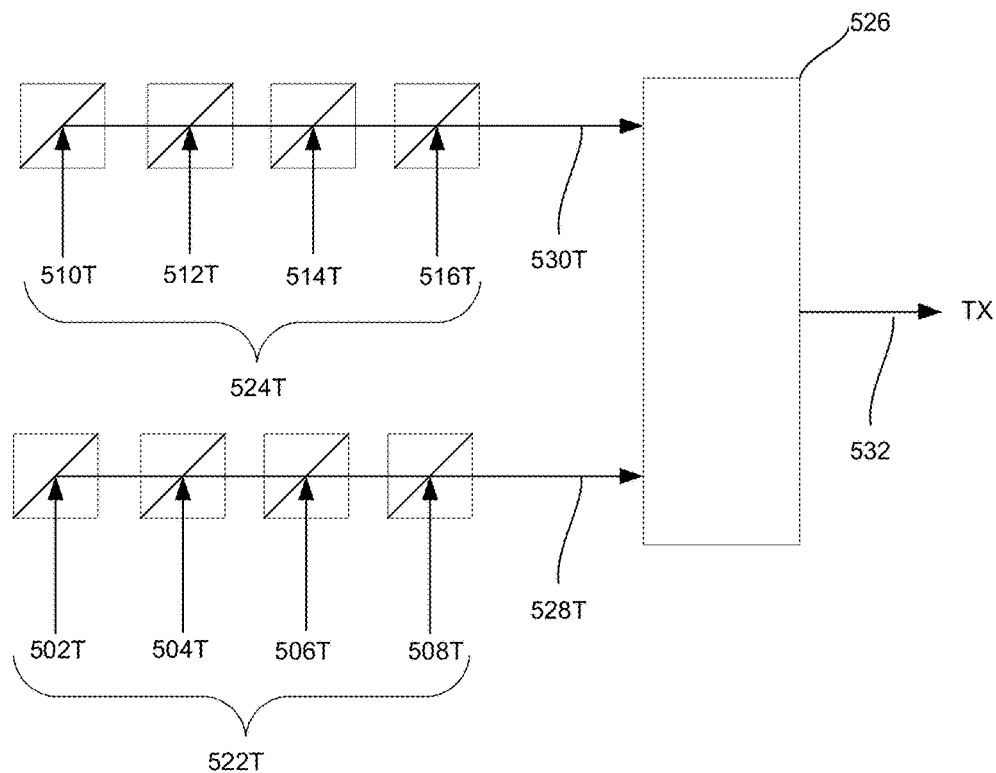
FIG. 5A illustrates an example of a two stage multiplexing configuration according to aspects of the disclosure.

FIG. 5A illustrates another example arrangement of lanes within a grid for a transmitter within the optical transceiver. The arrangement shown in FIG. 5A is a two stage multiplexing of signals. As shown, there may be two sets of lanes 522T, 524T. The first set of lanes 522T may include four lanes 502T-508T and the second set of lanes 524T may include four lanes 510T-516T. Each lane in the set of lanes 522T, 524T may be spaced 20 nm from the neighboring lane. Thus, each set of lanes 522T, 524T may create a 20 nm grid. However, a 20 nm grid is only one example and is not intended to be limiting. For example, each lane in the set of lanes 522T, 524T may be spaced between 1 nm-25 nm.

The signals from the first set of lanes 522T may be multiplexed into a first combined signal 528T and the signals from the second set of lanes 524T may be multiplexed into a second combined signal 530T. Multiplexing the first set of lanes 522T into the first combined signal 528T and multiplexing the second set of lanes 524T into the second combined signal 530T is the first stage of multiplexing. The first combined signal 528T and the second combined signal 530T may be multiplexed using an interleaver 526. This is the second stage of multiplexing. The interleaver may be an optical filter with a periodic pass and reject spectrum response. With the interleaver configuration, the maximum number of filter stages any optical channel goes through may be 5 vs. 8 based on the arrangement shown in FIG. 4. According to some examples, multiplexing the first and second combined signals 528T, 530T may create a denser composite signal with a smaller spacing. The composite signal 532 may be transmitted "TX" by the transmitter.

Figure 5B:
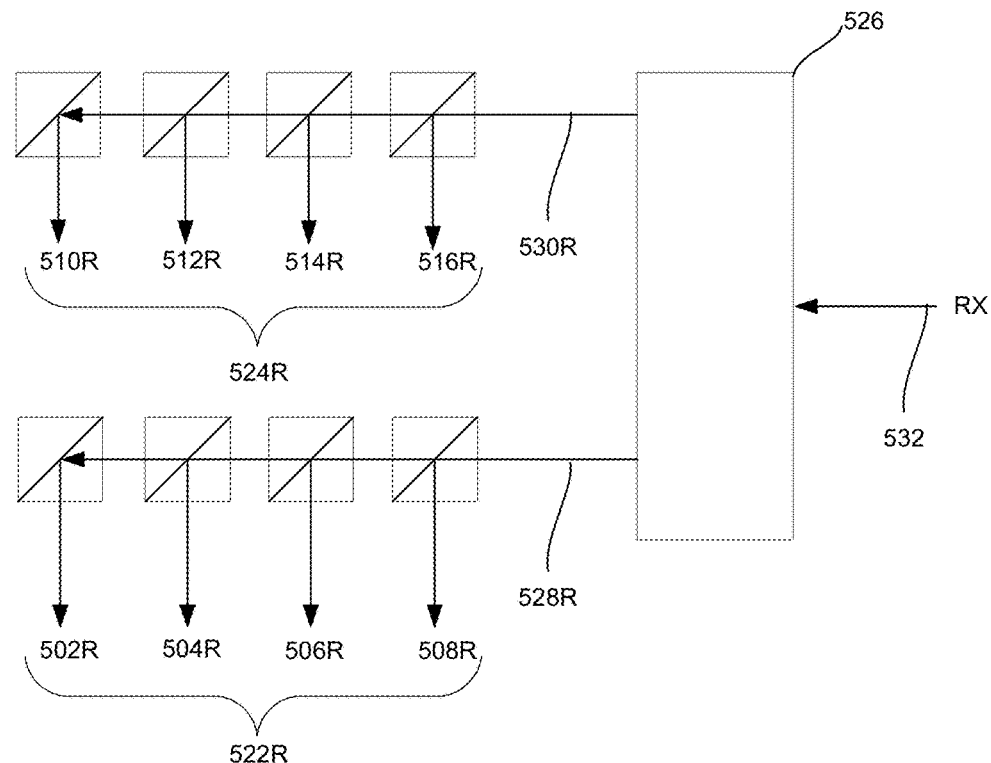
FIG. 5B illustrates an example of a two stage demultiplexing configuration according to aspects of the disclosure.

FIG. 5B illustrates another example arrangement of lanes within a grid for a receiver within the optical transceiver. The arrangement shown in FIG. 5B is a two stage demultiplexing of signals. For example, the receiver may receive "RX" a combined signal 532. The combined signal may be split, or demultiplexed, into two signals. The combined signal 532 may be split using interleaver 526. For example, the combined signal 532 may be split into a first signal 528R and a second signal 530R. The demultiplexing of the combined signal 532 is the first stage of the demultiplexing.

The first signal 528R and second signal 530R may each be a combined signal. For example, the first signal 528R may be a combination of signals corresponding to the first set of signals 522R. The first set of signals may correspond to lanes 502R-508R. The first signal 528R may be demultiplexed such that each lane 502R-508R receives its corresponding signal. For example, lanes 502R-508R may receive signals corresponding to wavelengths 1271 nm, 1291 nm, 1311 nm, and 1331 nm, respectively. The second signal 530R may be a combination of signals corresponding to a second set of signals 524R. The second set of signals 524R may correspond to lanes 510R-516R. The second signal 530R may be demultiplexed such that each lane 510R-516R receives its corresponding signal. For example, lanes 510R-516R may receive signals corresponding to wavelengths 1281 nm, 1301 nm, 1321 nm, and 1341 nm, respectively. Demultiplexing the first signal 528R and the second signal 530R is the second stage of demultiplexing.

Figure 6:
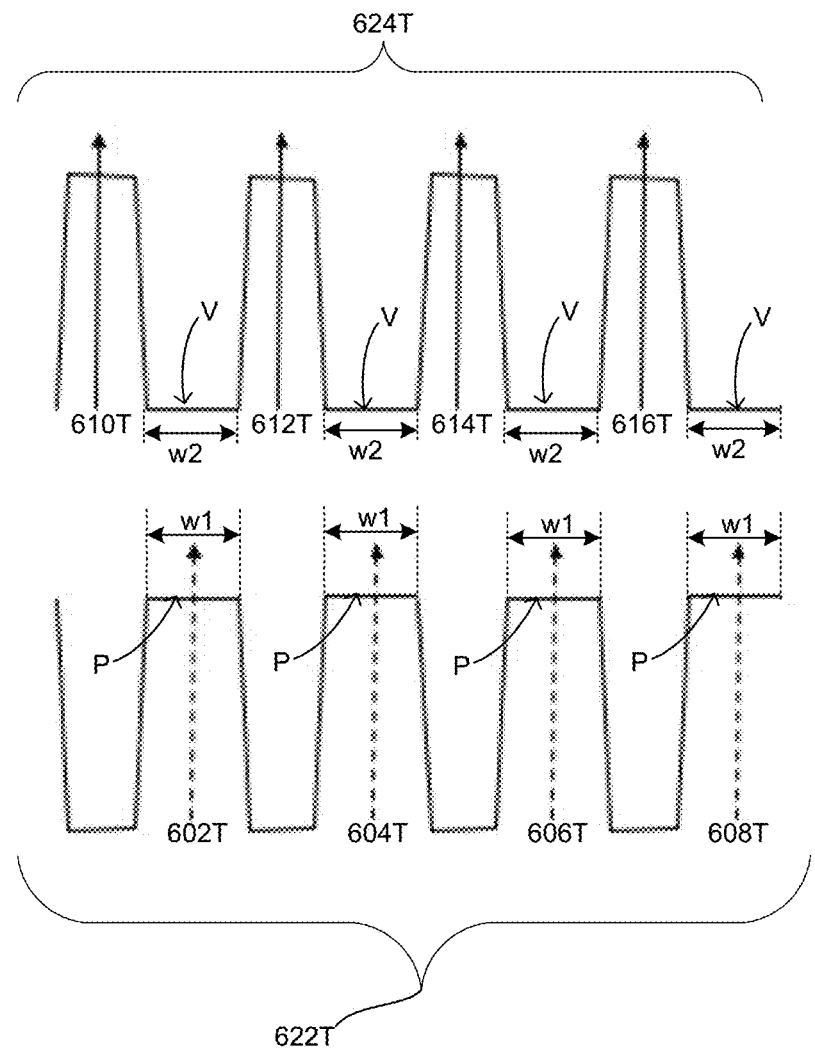
FIG. 6 illustrates an example illustrating interleaving of two sets of optical lanes according to aspects of the disclosure.

FIG. 6 illustrates the interleaving of a first composite signal and a second composite signal using an interleaver. The first composite optical signal (upper diagram or signal trace in FIG. 6) may comprise a signal representative of a first set of lanes, while the second composite signal (lower diagram or signal trace in FIG. 6) may comprise a signal representative of a second set of lanes. For example, a first set of signals 622T may be interleaved with a second set of signals 624T. The width "w1" of the peak "P" of each signal 602T-608T in the first set of signals 622T may substantially correspond to width "w2" of the valley "V" between each signal 610T-616T in the second set of signals 624T. According to some examples, width "w1" of peaks "P" may be equal to or less than width "w2" of valleys "V." In examples where the width "w1" of peaks "P" of the first set of signals 622T substantially corresponds to, is equal to, or is less than the width "w2" of valleys "V" of the second set of signals, the first set of signals 622T may fit between the second set of signals 624T. When the first set of signals 622T fits between the second set of signals 624T, the first set of signals 622T and the second set of signals 624T may be interleaved. According to some examples, interleaving the first set of signals 622T and the second set of signals 624T may also be referred to as multiplexing the first and second set of signals 622T, 624T. An interleaver may then periodically reject signals on the first or second set of composite signals.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. An optical transmitter, comprising:
   a multiplexer configured to multiplex at least one of a first set of optical signals and a second set of optical signals, the first set of optical signals each having a respective first passband and the second set of optical signals each having a respective second passband, at least one of the respective second passband being smaller than at least one of the respective first passband, and the at least one of the respective second passband is located between respective first passbands; and
   wherein the first set of optical signals and the second set of optical signals are aligned in a cascade such that each optical signal in the second set of optical signals travels a further distance between a source and a destination over a medium than each optical signal in the first set of optical signals.

2. The optical transmitter of claim 1, wherein the second set of optical signals are generated by a second set of lasers that are cooled using a thermoelectric cooler.

3. The optical transmitter of claim 1, wherein each of the first set of optical signals and the second set of optical signals includes four optical signals.

4. The optical transmitter of claim 3, wherein the four optical signals of the first set of optical signals includes optical signals having wavelengths of 1271 nm, 1291 nm, 1311 nm, and 1331 nm.

5. The optical transmitter of claim 3, wherein the four optical signals of the second set of optical signals includes optical signals having wavelengths of 1281 nm, 1301 nm, 1321 nm, and 1341 nm.

6. The optical transmitter of claim 3, wherein the four optical signals of the second set of optical signals includes optical signals having wavelengths of 1261 nm, 1281 nm, 1301 nm, and 1321 nm.

7. The optical transmitter of claim 1, wherein each optical signal of the first set of optical signals and each optical signal of the second set of optical signals is spaced 10 nm from an adjacent lane optical signal of the first set of optical signals or the second set of optical signals.

8. The optical transmitter of claim 1, further comprising an interleaver configured to interleave the multiplexed first set of optical signals and the multiplexed second set of optical signals into a composite signal.

9. The optical transmitter of claim 1, wherein the first set of optical signals in the cascade are arranged closer to a location where the multiplexed first set of optical signals or the multiplexed second set of optical signals is transmitted than the second set of optical signals.

* * * * *